US012028499B2

(12) United States Patent
Itoh et al.

(10) Patent No.: US 12,028,499 B2
(45) Date of Patent: Jul. 2, 2024

(54) IMAGE PROCESSING APPARATUS, IMAGE PROCESSING METHOD, AND NON-TRANSITORY RECORDING MEDIUM

(71) Applicants: Shinya Itoh, Tokyo (JP); Hiroyuki Sakuyama, Tokyo (JP)

(72) Inventors: Shinya Itoh, Tokyo (JP); Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/364,854

(22) Filed: Aug. 3, 2023

(65) Prior Publication Data

US 2024/0171695 A1 May 23, 2024

(30) Foreign Application Priority Data

Nov. 21, 2022 (JP) ................. 2022-185736

(51) Int. Cl.
*H04N 1/387* (2006.01)
*H04N 1/00* (2006.01)

(52) U.S. Cl.
CPC ....... *H04N 1/3877* (2013.01); *H04N 1/00331* (2013.01); *H04N 1/00336* (2013.01); *H04N 1/00482* (2013.01)

(58) Field of Classification Search
CPC .......... G06N 20/00; G06N 3/08; G06N 3/045; G06V 30/10; G06V 10/82; G06V 10/40; G06V 30/153; G06V 40/16; G06V 40/171; G06V 30/1463; G06V 30/166; G06V 30/18057; G06F 16/9024; G06F 17/18; G06F 18/214; G06F 18/217; G06Q 50/01; G06T 2207/20132; G06T 7/10; H04N 1/3877; H04N 1/00331; H04N 1/00336; H04N 1/00482
See application file for complete search history.

(56) References Cited

U.S. PATENT DOCUMENTS

| 6,137,595 | A | 10/2000 | Sakuyama et al. |
| 6,226,011 | B1 | 5/2001 | Sakuyama et al. |
| 8,150,166 | B2 * | 4/2012 | Matsuda ............... G06V 30/413 382/173 |
| 9,043,349 | B1 * | 5/2015 | Lin ......................... G06V 20/62 704/235 |
| 2002/0039440 | A1 | 4/2002 | Sakuyama |
| 2002/0159644 | A1 | 10/2002 | Sakuyama |
| 2002/0196970 | A1 | 12/2002 | Sano et al. |
| 2003/0002742 | A1 | 1/2003 | Sano et al. |
| 2003/0228061 | A1 | 12/2003 | Sakuyama |
| 2004/0013310 | A1 | 1/2004 | Suino et al. |
| 2004/0109610 | A1 | 6/2004 | Kodama et al. |

(Continued)

FOREIGN PATENT DOCUMENTS

JP 2007-324648 A 12/2007
JP 2008-017032 A 1/2008
(Continued)

*Primary Examiner* — Negussie Worku
(74) *Attorney, Agent, or Firm* — IPUSA, PLLC

(57) ABSTRACT

An image processing apparatus includes circuitry to determine a type of a document read by a scanner, set a top-bottom determination method based on the type of the document, and determine a top-bottom orientation of a target image by the top-bottom determination method. The target image is obtained by reading the document with the scanner.

10 Claims, 7 Drawing Sheets

NORTH      EAST      SOUTH      WEST

(56) References Cited

U.S. PATENT DOCUMENTS

| | | |
|---|---|---|
| 2004/0126019 A1 | 7/2004 | Ikebe et al. |
| 2004/0126020 A1 | 7/2004 | Sakuyama et al. |
| 2004/0126029 A1 | 7/2004 | Sakuyama et al. |
| 2004/0130570 A1 | 7/2004 | Sakuyama et al. |
| 2004/0131264 A1 | 7/2004 | Sakuyama et al. |
| 2004/0136595 A1 | 7/2004 | Sakuyama et al. |
| 2004/0141651 A1 | 7/2004 | Hara et al. |
| 2004/0146160 A1 | 7/2004 | Nomizu et al. |
| 2004/0151386 A1 | 8/2004 | Kodama et al. |
| 2004/0156548 A1 | 8/2004 | Kodama et al. |
| 2004/0190782 A1 | 9/2004 | Nomizu et al. |
| 2004/0202372 A1 | 10/2004 | Sakuyama et al. |
| 2004/0217887 A1 | 11/2004 | Nomizu et al. |
| 2004/0218817 A1 | 11/2004 | Kodama et al. |
| 2004/0228534 A1 | 11/2004 | Sakuyama et al. |
| 2004/0252897 A1 | 12/2004 | Hara et al. |
| 2004/0264785 A1 | 12/2004 | Suino et al. |
| 2005/0015247 A1 | 1/2005 | Sakuyama et al. |
| 2005/0031215 A1 | 2/2005 | Nomizu et al. |
| 2005/0036695 A1 | 2/2005 | Yano et al. |
| 2005/0036701 A1 | 2/2005 | Miyazawa et al. |
| 2005/0111740 A1 | 5/2005 | Sakuyama |
| 2005/0238205 A1* | 10/2005 | Kimura .................. G06V 10/98 382/309 |
| 2006/0152391 A1 | 7/2006 | Sakuyama |
| 2006/0245655 A1 | 11/2006 | Suino et al. |
| 2006/0269151 A1 | 11/2006 | Sakuyama |
| 2007/0189622 A1 | 8/2007 | Sakuyama |
| 2007/0242889 A1 | 10/2007 | Sakuyama |
| 2008/0131013 A1 | 6/2008 | Suino et al. |
| 2009/0046939 A1 | 2/2009 | Sakuyama et al. |
| 2009/0274392 A1* | 11/2009 | Fan .................... G06V 30/1463 382/289 |
| 2009/0285498 A1 | 11/2009 | Sakuyama |
| 2010/0034473 A1 | 2/2010 | Sadasue et al. |
| 2010/0149569 A1* | 6/2010 | Yoshida ............... G06V 30/262 358/1.11 |
| 2010/0316295 A1* | 12/2010 | Morimoto .......... G06V 30/1463 345/173 |
| 2011/0064309 A1 | 3/2011 | Sadasue et al. |
| 2015/0264197 A1 | 9/2015 | Sato et al. |
| 2016/0219164 A1* | 7/2016 | Noguchi ............ H04N 1/00461 |
| 2019/0266397 A1* | 8/2019 | Arakawa ............... G06V 30/418 |
| 2021/0073566 A1* | 3/2021 | Hoehne .................... G06T 7/10 |
| 2021/0383108 A1 | 12/2021 | Itoh |
| 2022/0180091 A1* | 6/2022 | Tatsumi ................. G06V 10/82 |
| 2022/0311892 A1* | 9/2022 | Itoh ...................... G06V 30/413 |
| 2022/0360685 A1* | 11/2022 | Li ...................... H04N 1/00087 |
| 2023/0027065 A1 | 1/2023 | Sakuyama |
| 2023/0062113 A1* | 3/2023 | Oishi ........................ G06T 5/50 |
| 2023/0196711 A1* | 6/2023 | Itoh ...................... G06V 30/1463 382/172 |
| 2023/0247165 A1* | 8/2023 | Matsuda ............... H04N 1/233 358/1.18 |

FOREIGN PATENT DOCUMENTS

| | | |
|---|---|---|
| JP | 2011-008549 A | 1/2011 |
| JP | 2022-090536 A | 6/2022 |
| JP | 2022-147074 A | 10/2022 |
| JP | 2023-092869 A | 7/2023 |

\* cited by examiner

FIG. 5

| OCR SETTING INFORMATION | DOCUMENT TYPE DETERMINATION RESULT |
|---|---|
| USE OCR | MANY CHARACTERS OR NUMERALS |
| NOT USE OCR | FEW CHARACTERS OR NUMERALS |

FIG. 6

| DOCUMENT TYPE DETERMINATION RESULT | TOP-BOTTOM DETERMINATION METHOD |
|---|---|
| MANY CHARACTERS OR NUMERALS | OCR TOP-BOTTOM DETERMINATION |
| FEW CHARACTERS OR NUMERALS | AI TOP-BOTTOM DETERMINATION (NON-OCR TOP-BOTTOM DETERMINATION) |

FIG. 8

| INPUT TO MODEL | DOCUMENT TYPE DETERMINATION RESULT (OUTPUT FROM MODEL) |
|---|---|
| IMAGE DATA | ·TEXT DOCUMENT<br>·BUSINESS FORM<br>·PHOTOGRAPH<br>·DRAWING |

FIG. 9

| DOCUMENT TYPE DETERMINATION RESULT | TOP-BOTTOM DETERMINATION METHOD |
|---|---|
| TEXT DOCUMENT | OCR TOP-BOTTOM DETERMINATION |
| BUSINESS FORM | OCR TOP-BOTTOM DETERMINATION |
| PHOTOGRAPH | AI TOP-BOTTOM DETERMINATION (NON-OCR TOP-BOTTOM DETERMINATION) |
| DRAWING | AI TOP-BOTTOM DETERMINATION (NON-OCR TOP-BOTTOM DETERMINATION) |

IMAGE PROCESSING APPARATUS, IMAGE PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-185736, filed on Nov. 21, 2022, in the Japan Patent Office, the entire disclosure of which is hereby incorporated by reference herein.

BACKGROUND

Technical Field

Embodiments of the present disclosure relate to an image processing apparatus, an image processing method, and a carrier medium.

Related Art

When a document is read by a scanner, the document may be read in a wrong direction such that the orientation of the document is reversed or sideways. There is a known technique of automatically determining the top-bottom orientation (may be referred to simply as "orientation") of a document read in such a wrong orientation and correcting the orientation of the document. Determining the top-bottom orientation may be referred to as top-bottom identification in the following description.

For example, optical character recognition (OCR) is used in determining the top-bottom orientation. For example, a model of a neural network based on deep learning is used in determining the top-bottom orientation. Typically, a deep neural network (DNN) is adopted in such a neural network model.

SUMMARY

In one aspect, an image processing apparatus includes circuitry to determine a type of a document read by a scanner, set a top-bottom determination method based on the type of the document, and determine a top-bottom orientation of a target image by the top-bottom determination method. The target image is obtained by reading the document with the scanner.

In another aspect, an image processing method includes determining a type of a document read by a scanner, setting a top-bottom determination method based on the type of the document, and determining a top-bottom orientation of a target image by the top-bottom determination method. The target image is obtained by reading the document with the scanner.

In another aspect, a non-transitory recording medium stores a plurality of program codes which, when executed by one or more processors, causes the processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating a table storing document type determination results according to a first embodiment of the present disclosure;

FIG. 6 is a diagram illustrating a table storing setting values of top-bottom determination methods according to the first embodiment of the present disclosure;

FIG. 8 is a diagram illustrating document type determination results according to a second embodiment of the present disclosure;

FIG. 9 is a diagram illustrating a table storing setting values of top-bottom determination methods according to the second embodiment of the present disclosure.

Figure 1:
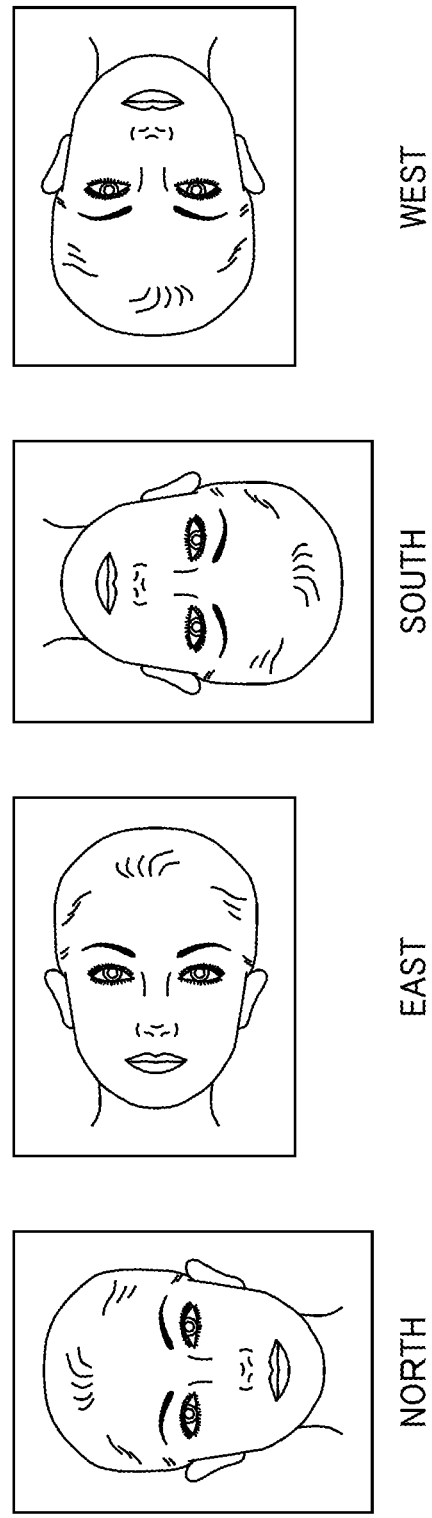
FIG. 1 is a diagram illustrating scanning directions of a document.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. In the drawings, an identical or similar reference numeral designates a component having identical or similar function, and redundant descriptions are omitted in the following description. As used herein, the singular forms "a," "an," and "the" are intended to include the plural forms as well, unless the context clearly indicates otherwise.

When a document is read by a scanner, the document may be read in a wrong direction such that the orientation of the document is reversed or sideways. FIG. 1 is a diagram illustrating scanning directions of a document. In FIG. 1, for example, a document having the orientation as indicated by "north" may be read in the orientation as indicated by "south" (i.e., upside down) or in the orientation as indicated by "east" or "west" (i.e., sideways).

Although the labels of cardinal points ("north," "east," "west," and "south") indicate the top of the document in FIG. 1, the orientation of the document may be indicated by any label that is in a proper relation with the orientation. For example, the top-bottom orientation may be indicated by indexes such as 0 to 3.

There are various methods to determine the top-bottom orientation of a document. For example, there is a top-bottom determination method based on a processing result of OCR, which may be referred to as an "OCR top-bottom determination method" in the following description. There are top-bottom determination methods that do not use OCR, such as a top-bottom determination method using a line rectangle and a top-bottom determination method based on a prediction result of a DNN. Such a top-bottom determination method based on a prediction result of a DNN may be referred to as "artificial intelligence (AI) top-bottom determination methods" in the following description.

In some scanners, OCR is not a standard function but is an optional function. When the scanner does not have an OCR function, the OCR top-bottom determination method is not usable.

By contrast, top-bottom determination methods that do not use OCR, which may be referred to as "non-OCR top-bottom determination methods" in the following description, such as an AI top-bottom determination method can be used regardless of whether the OCR function is installed. In other words, when the OCR function is installed, both the OCR top-bottom determination method and the non-OCR top-bottom determination method can be used.

A plurality of top-bottom determination methods may become available some time after the introduction of an apparatus. For example, at the time of introduction, the optional OCR function is not installed, and the AI top-bottom determination method that is a default top-bottom determination method installed in the apparatus is used. After the optional OCR function is installed, a plurality of top-bottom determination methods becomes available. When the optional OCR function is installed, the frequency of performing top-bottom determination simultaneously with OCR will increase. In this case, the frequency of scanning a document easily processed by OCR increases, and the accuracy of the OCR top-bottom determination is probably higher than the AI top-bottom determination.

However, in a configuration in which the top-bottom determination method is not automatically switched at the time of installation of the optional OCR function, a user may forget to manually switch the top-bottom determination method. In this case, the default AI top-bottom determination method is applied even after the optional OCR function is installed. Depending on the document, the accuracy of OCR top-bottom determination method may be good, but the accuracy of the AI top-bottom determination method may be poor. In such a case, not only the accuracy of top-bottom determination but also the accuracy of character recognition decreases.

An approach to avoid the above-described inconvenience is switching the setting value of the top-bottom determination method according to whether the optional OCR function is installed. This approach, however, does not take account of a case where the user intends to perform top-bottom determination but not to use the optional OCR function installed on the apparatus.

For example, even if the optional OCR function is installed, there is an option of not performing OCR as in the case before the optional OCR function is installed. Depending on the document or the intended use, the user may decide to perform top-bottom determination but not to perform OCR. For example, when the OCR top-bottom determination method is used in the scanning of a document not suitable for OCR (for example, a document including many photographs or a document in a language not supported by OCR), the accuracy of top-bottom determination decreases. In addition, since performing OCR increases the processing time and the file size, applying OCR to the document having no region subjected to OCR is not desirable.

Further, in actual use, sometimes a mixture of a document suitable for OCR and a document unsuitable for OCR is scanned. Even when a plurality of top-bottom determination methods is available, generally one top-bottom determination method is used for one scanning. In other words, the top-bottom determination method is not switched for each of documents (or each page of a document) scanned at a time. For example, when the OCR top-bottom determination method is set, only the OCR top-bottom determination method is used in the scanning of a plurality of documents (or in the scanning of a document having a plurality of pages or sheets). In this disclosure, a plurality of documents scanned at a time may be a document having a plurality of pages scanned at a time. In this case, it is not desirable to scan a mixture of a document to be subjected to the OCR top-bottom determination method and a document to be subjected to the AI top-bottom determination method at a time.

Several kinds of top-bottom determination methods are known in the art, but different types of documents are best recognized by different top-bottom determination methods. In other words, a top-bottom determination method that can determine the top and bottom of a document with high accuracy cannot determine the top and bottom of a different type of document with high accuracy. For example, the accuracy of the OCR top-bottom determination method can be higher when the document is a text document in a language supported by the OCR function. The accuracy of the AI top-bottom determination method can be higher when the document is a text document in a language not supported by the OCR function or the document is, for example, a photograph having few characters. As a result, when a plurality of documents (or a document having a plurality of pages) of different types is scanned at a time, it is probable that changing the top-bottom determination method in accordance with whether the optional OCR function is installed lowers the accuracy of top-bottom determination depending on the document.

An object of embodiments of the present disclosure is selecting an appropriate top-bottom determination method in accordance with characteristics of a document so as to increase the accuracy of the top-bottom determination of a scanned image when a plurality of top-bottom determination methods is available.

First Embodiment

A description is given of an image forming apparatus that reads a document with a scanner and outputs a scanned image, according to a first embodiment of the present disclosure. The image forming apparatus according to the present embodiment has functions of determining the top-bottom orientation of a scanned image obtained by reading a document with a scanner and correcting the top-bottom orientation of the scanned image so as to match the top-bottom orientation of the document.

The image forming apparatus according to the present embodiment determines the type of a document (also referred to as "document type" in the following description) read by a scanner and determines the top-bottom orientation of an image using a top-bottom determination method corresponding to the document type.

In the present embodiment, the document type is determined based on setting information indicating whether OCR is to be used. Such setting information is referred to as "OCR setting information" in the following description. OCR is a function typically used for a document having many characters. When a user selects the use of OCR, the probability that the document is suitable for the OCR top-bottom determination method is high. By contrast, when the user does not select the use of OCR, the probability that the document is suitable for the OCR top-bottom determination method is low. Accordingly, when the top-bottom determination method is selected in accordance with the OCR setting information, the suitable top-bottom determination method can be selected.

Hardware Configuration

Figure 2:
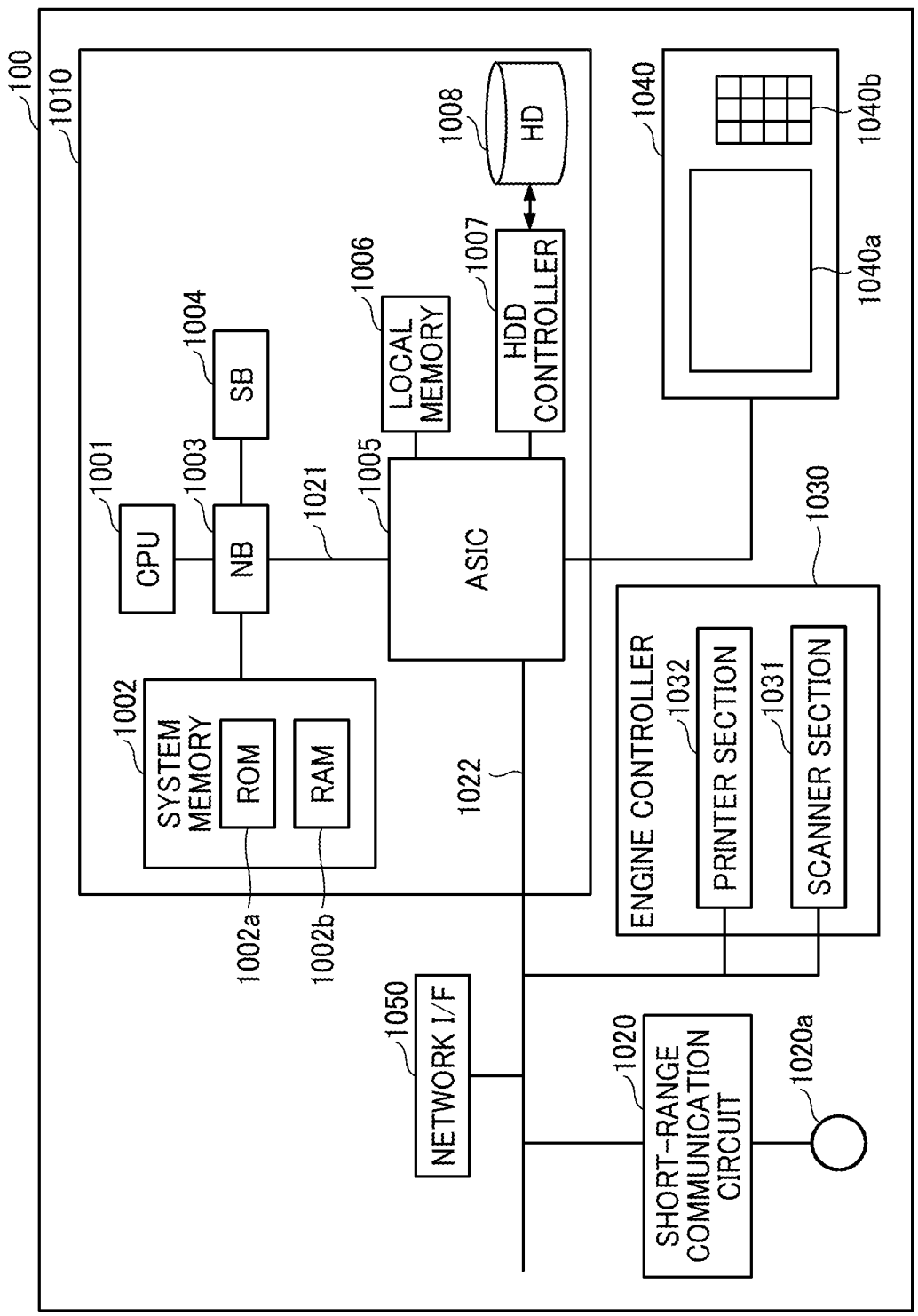
FIG. 2 is a block diagram illustrating a hardware configuration of an image forming apparatus according to embodiments of the present disclosure.

A description is given of a hardware configuration of the image forming apparatus according to the present embodiment, with reference to FIG. 2. FIG. 2 is a block diagram illustrating a hardware configuration of the image forming apparatus according to the present embodiment.

As illustrated in FIG. 2, an image forming apparatus 100 includes a controller 1010, a short-range communication circuit 1020, an engine controller 1030, a control panel 1040, and a network interface (I/F) 1050.

Specifically, the controller 1010 includes a central processing unit (CPU) 1001 as a main part of a computer, a system memory 1002, a northbridge (NB) 1003, a southbridge (SB) 1004, an application-specific integrated circuit (ASIC) 1005, a local memory 1006 as a storage device, a hard disk drive (HDD) controller 1007, and a hard disk or hard drive (HD) 1008 as a storage device. The NB 1003 and the ASIC 1005 are connected to each other by an accelerated graphics port (AGP) bus 1021.

The CPU 1001 controls the entire operation of the image forming apparatus 100. The NB 1003 is a bridge that connects the CPU 1001 to the system memory 1002, the SB 1004, and the AGP bus 1021. The NB 1003 includes a peripheral component interconnect (PCI) master, an AGP target, and a memory controller that controls reading and writing data from and to the system memory 1002.

The system memory 1002 includes a read only memory (ROM) 1002a and a random access memory (RAM) 1002b. The ROM 1002a stores data and programs for implementing various functions of the controller 1010. For example, the RAM 1002b is used to load the programs and the data. The RAM 1002b is also used as a memory for loading drawing data in printing. For the purpose of distribution, the programs stored in the RAM 1002b may be stored in a computer-readable recording medium, such as a compact disc read-only memory (CD-ROM), a compact disc-recordable (CD-R), or a digital versatile disc (DVD), as a file in a format installable or executable by a computer.

The SB 1004 is a bridge that connects the NB 1003 to PCI devices and peripheral devices. The ASIC 1005 is an integrated circuit (IC) dedicated to image processing and has a hardware element for image processing. The ASIC 1005 is a bridge that connects the AGP bus 1021, a PCI bus 1022, the HDD controller 1007, and the local memory 1006.

The ASIC 1005 includes a PCI target, an AGP master, an arbiter (ARB) serving as a core of the ASIC 1005, a memory controller that controls the local memory 1006, a plurality of direct memory access controllers (DMACs), and a PCI unit. The DMACs rotate image data with, for example, a hardware logic. The PCI unit transfers and receives data to and from a scanner section 1031 and a printer section 1032 via the PCI bus 1022. The ASIC 1005 may be connected to a universal serial bus (USB) interface or an Institute of Electrical and Electronics Engineers (IEEE) 1394 interface.

The local memory 1006 is used as a buffer for an image to be copied and a buffer for coding. The HD 1008 is a storage device that stores image data, font data used in printing, and form data. The HDD controller 1007 controls an HDD to read or write data from or to the HD 1008 under the control of the CPU 1001. The AGP bus 1021 is a bus interface for a graphics accelerator card, which has been proposed to accelerate graphics processing. The AGP bus 1021 directly accesses the system memory 1002 at high throughput, thereby accelerating the graphics accelerator card.

The short-range communication circuit 1020 is provided with a short-range communication antenna 1020a. The short-range communication circuit 1020 is a communication circuit in compliance with, for example, near field communication (NFC) or BLUETOOTH.

The engine controller 1030 includes the scanner section 1031 and the printer section 1032. The control panel 1040 includes a panel display 1040a and an operation panel 1040b. The panel display 1040a is, for example, a touch panel that displays current settings or a selection screen and receives user input. The operation panel 1040b includes, for example, a numeric keypad and a start key. The numeric keypad receives assigned values of image forming parameters including an image density parameter. The start key receives an instruction to start, for example, copying. The controller 1010 controls the entire operation of the image forming apparatus 100 and controls, for example, drawing, communication, and input from the control panel 1040. The scanner section 1031 and the printer section 1032 have a capability of image processing such as error diffusion and gamma conversion.

The image forming apparatus 100 can sequentially switch among a document server function, a copier function, a printer function, and a facsimile function in accordance with input via, for example, an application switch key on the control panel 1040. The image forming apparatus 100 enters a document server mode when the document server function is selected, enters a copy mode when the copy function is selected, enters a printer mode when the printer function is selected, and enters a facsimile mode when the facsimile function is selected.

The network OF 1050 is an interface for performing data communication through a communication network. The short-range communication circuit 1020 and the network OF 1050 are electrically connected to the ASIC 1005 via the PCI bus 1022.

Functional Configuration

A description is given below of a functional configuration of the image forming apparatus according to the present embodiment with reference to FIG. 3.

Figure 3:
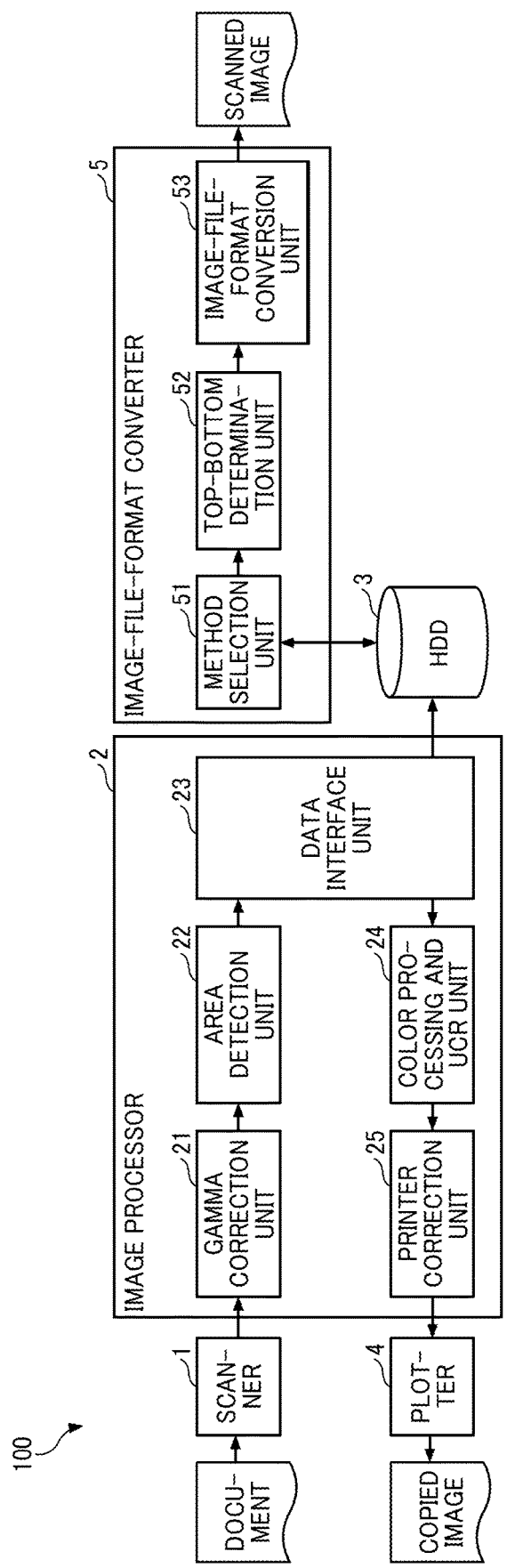
FIG. 3 is a block diagram illustrating a functional configuration of an image forming apparatus according to embodiments of the present disclosure.

FIG. 3 is a block diagram illustrating a functional configuration of the image forming apparatus according to the present embodiment.

The image forming apparatus 100 according to the present embodiment is a digital color image forming apparatus. As illustrated in FIG. 3, the digital color image forming apparatus 100 includes a scanner 1, an image processor 2, a hard disk drive (HDD) 3, a plotter 4, and an image-file-format converter 5. The digital color image forming apparatus 100 functions as the scanner 1, the image processor 2, the HDD 3, the plotter 4, and the image-file-format converter 5 by executing programs.

The scanner 1 reads image data from a document. The scanner 1 transmits the read image data (i.e., scanned image) to the image processor 2.

The image processor 2 determines whether a pixel or pixel block of interest in the image data read by the scanner 1 is a text area or a non-text area (i.e., a pattern area) and whether the pixel or pixel block of interest has a chromatic color or an achromatic color. The image processor 2 performs color reproduction suitable for the document based on the determination result.

The image processor 2 includes a gamma correction unit 21, an area detection unit 22, a data interface unit 23, a color processing and under color removal (UCR) unit 24, and a printer correction unit 25. The image processor 2 executes processing for obtaining a copy image and a scanned image.

The gamma correction unit 21 performs one-dimensional conversion on the image data read by the scanner 1, to adjust the tone balance of each color of the image data. Specifically, the one-dimensional conversion is performed on 8-bit signals of each of red (R), green (G), and blue (B) after analog-to-digital conversion. For the sake of explanatory convenience, it is assumed in the present embodiment that density linear signals (RGB signals in which 0 is a signal value that indicates white) are obtained after the conversion. The output of the gamma correction unit 21 is transmitted to the area detection unit 22 and further to the data interface unit 23.

The area detection unit 22 includes a character determination unit and a color determination unit. The character determination unit determines whether the pixel or pixel block of interest in the image data belongs a text area or a non-text area (i.e., an illustration or design area). The color determination unit determines whether the pixel or pixel block of interest in the image data is chromatic or achromatic.

The data interface unit 23 is an HDD-management interface that temporarily stores, in the HDD 3, the image data processed by the gamma correction unit 21 and the determination result from the area detection unit 22. The data interface unit 23 transmits, to the color processing and UCR unit 24, the image data processed by the gamma correction unit 21 and the determination result from the area detection unit 22.

The color processing and UCR unit 24 selects color processing or UCR processing based on the determination result from the area detection unit 22.

The printer correction unit 25 receives cyan (c), magenta (m), yellow (y), and black (Bk) image signals from the color processing and UCR unit 24 and performs gamma correction and dithering in consideration of printer characteristics. Then, the printer correction unit 25 transmits the processed signals to the plotter 4.

The HDD 3 temporarily stores the image data processed by the gamma correction unit 21 and the determination result from the area detection unit 22. The image data temporarily stored in the HDD 3 is read out by the image-file-format converter 5.

The plotter 4 performs transferring and printing. The plotter 4 transfers the image data output from the image processor 2 to a recording medium.

The image-file-format converter 5 reads, from the HDD 3, the image data processed by the gamma correction unit 21 and temporarily stored therein and performs top-bottom determination on the image data (also referred to as "target image" in the following description). The image-file-format converter 5 uses the result of the top-bottom determination to convert the image data into a file format of, for example, portable document format (PDF) or Office Open Extensible Markup Language (XML) document format adopted for MICROSOFT WORD.

The image-file-format converter 5 includes a method selection unit 51, a top-bottom determination unit 52, and a file format conversion unit 53. The image-file-format converter executes processing for top-bottom determination of image data. More specifically, the image-file-format converter 5 performs processing for determining the top-bottom orientation of image data and converting the file format using the result of the top-bottom determination.

The method selection unit 51 selects the top-bottom determination method to be used by the top-bottom determination unit 52 on the subsequent stage. The top-bottom determination method selected by the method selection unit 51 is input to the top-bottom determination unit 52 in addition to the image data read from the HDD 3.

The top-bottom determination unit 52 applies pre-processing corresponding to the top-bottom determination method selected by the method selection unit 51 to the image data read from the HDD 3. Then, the top-bottom determination unit 52 performs top-bottom determination by the method selected by the method selection unit 51. Examples of the pre-processing corresponding to the top-bottom determination method include binarization, reducing, and enlarging. A top-bottom determination result indicates one of north, east, west, and south as the location of the top of the document. The top-bottom determination result obtained by the top-bottom determination unit 52 is output to the file format conversion unit 53.

The file format conversion unit 53 converts the image data read from the HDD 3 into data in a file format such as PDF or Office Open XML document format using the top-bottom determination result output from the top-bottom determination unit 52.

Figure 4:
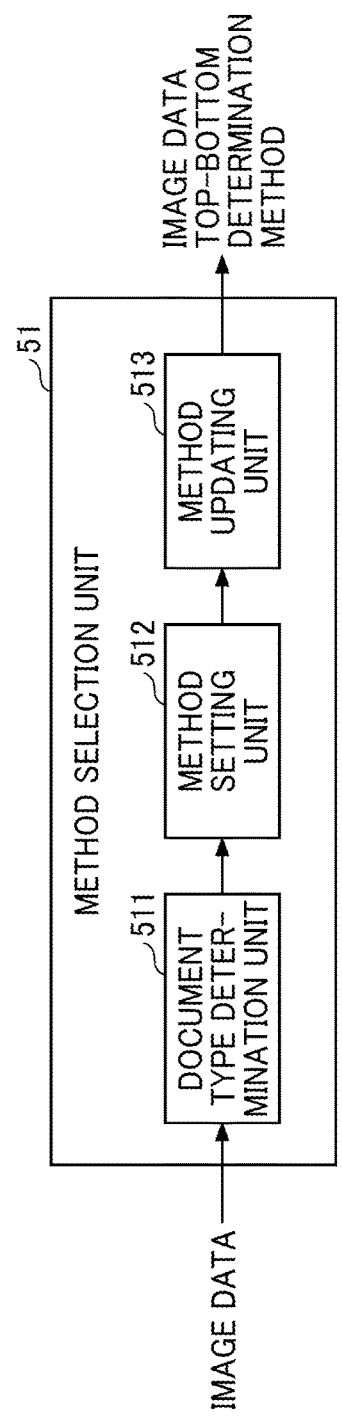
FIG. 4 is a block diagram illustrating a functional configuration of a method selection unit according to embodiments of the present disclosure.

A description is given below of a functional configuration of the method selection unit according to the present embodiment with reference to FIG. 4. FIG. 4 is a block diagram illustrating a functional configuration of the method selection unit according to the present embodiment.

The method selection unit 51 includes a document type determination unit 511, a method setting unit 512, and a method updating unit 513.

The document type determination unit 511 determines the document type of the image data read from the HDD 3. The document type determination result output by the document type determination unit 511 is input to the method setting unit 512 in addition to the image data read from the HDD 3. If the image forming apparatus 100 does not adopt a plurality of top-bottom determination methods, the document type determination can be omitted. When document type determination is not performed, only the image data read from the HDD 3 is input to the method setting unit 512.

The document types and the number of document types determined by the document type determination unit 511 are not limited. For example, documents may be classified into documents having many characters or numerals (e.g., a text document and a business form) and documents having few characters or numerals (e.g., a photograph and a drawing). Alternatively, documents may be classified into more subdivided document types.

The method for determining the document type is not limited. A desirable method can be determined in accordance with document types to be determined and the number of document types. In the present embodiment, setting information indicating whether OCR is to be used is used for determining a document type, and documents are classified into documents having many characters or numerals and documents having few characters or numerals. These document types are also referred to as "many characters or numerals" type and "few characters or numerals" type in the description below.

FIG. 5 is a diagram illustrating a table storing document type determination results according to the present embodiment. As illustrated in FIG. 5, in the present embodiment, when the OCR setting information indicates that OCR is to be used, the document type is determined as the "many characters or numerals" type. By contrast, when the OCR setting information indicates that OCR is not to be used, the document type is determined as the "few characters or numerals" type. This is because OCR is typically used for a document having many characters.

The method setting unit 512 sets a top-bottom determination method associated, in advance, with the document type based on the document type determination result output by the document type determination unit 511. The setting value of the top-bottom determination method set by the method setting unit 512 is input to the method updating unit 513 in addition to the image data read from the HDD 3.

Each document type that can be output by the document type determination unit 511 is associated in advance with the top-bottom determination method to be set. FIG. 6 is a diagram illustrating a table storing setting values of the top-bottom determination methods according to the present embodiment. The table of FIG. 6 is stored in any desired memory to be referred by the method setting unit 512. Further, as long as information indicating a specific top-bottom determination method can be obtained, such information does not have to be stored in a format of table as illustrated in FIG. 6. As illustrated in FIG. 6, in the present embodiment, when the document type is the "many characters or numerals" type, the top-bottom determination method is set to the OCR top-bottom determination method. By contrast, when the document type is the "few characters or numerals" type, the top-bottom determination method is set to the AI top-bottom determination method. Alternatively, a non-OCR top-bottom determination method other than the AI top-bottom determination method may be associated with the "few characters or numerals" type.

When there are three or more document types that can be output, a common top-bottom determination method may be assigned to two or more document types. If the image forming apparatus 100 does not adopt a plurality of top-bottom determination methods, the method setting unit 512 sets one top-bottom determination method available.

The method updating unit 513 presents, to a user, the setting value of the top-bottom determination method set by the method setting unit 512 based on the document type determination result and available options for the top-bottom determination method. The method updating unit 513 updates the setting value of the top-bottom determination method according to the user's selection. However, it is not essential to update the setting value of the top-bottom determination method. When the user does not select another top-bottom determination method, the method updating unit 513 outputs the setting value of the top-bottom determination method set by the method setting unit 512 as it is.

The setting value of the top-bottom determination method updated (or not updated) by the method updating unit 513 is input to the top-bottom determination unit 52 in addition to the image data read from the HDD 3.

Processing Procedure

Figure 7:
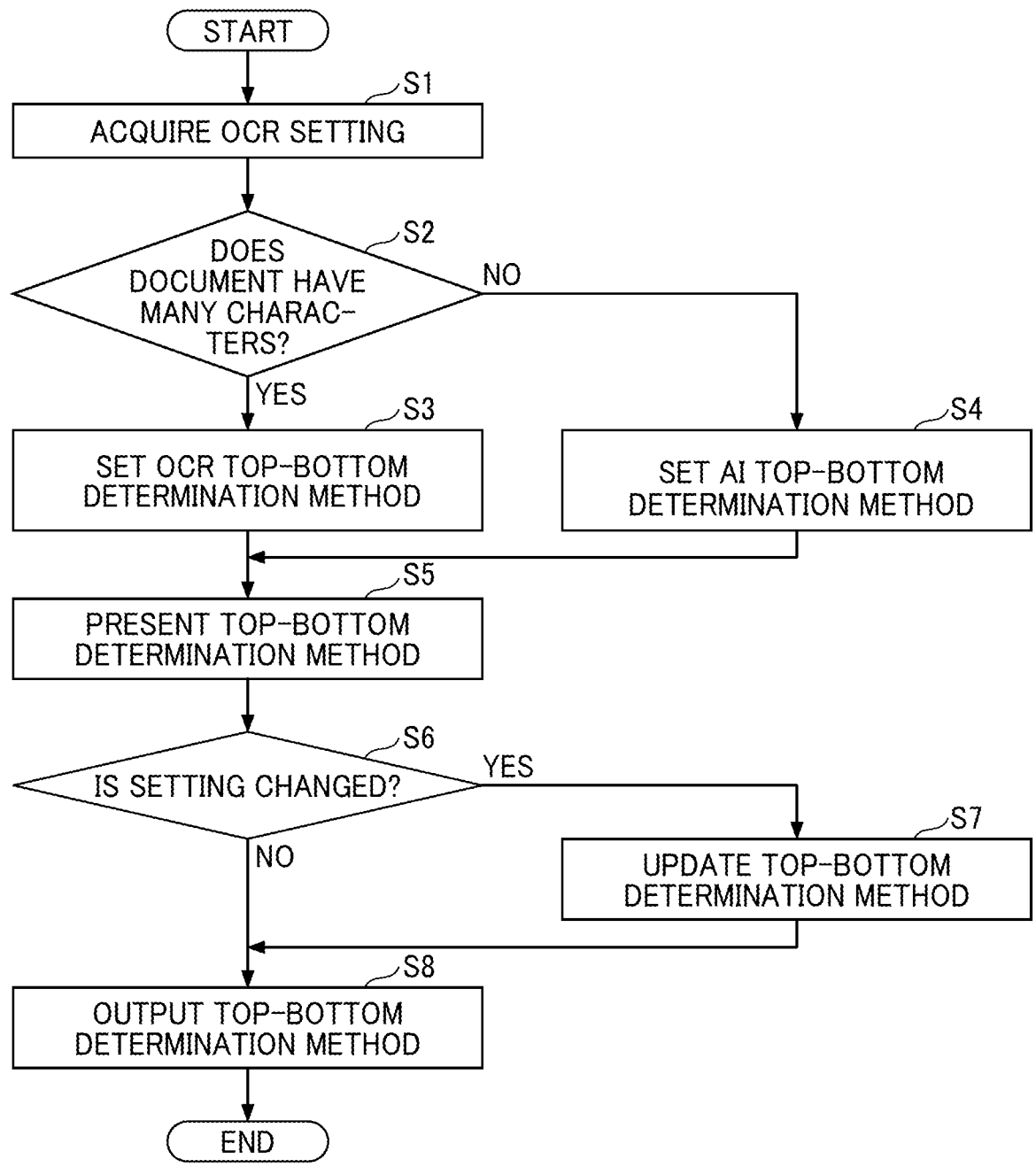
FIG. 7 is a flowchart of a method selection process according to the first embodiment of the present disclosure.

A description is given below of a method selection process performed by the method selection unit 51 according to the present embodiment with reference to FIG. 7. FIG. 7 is a flowchart of the method selection process according to the present embodiment.

In step S1, the document type determination unit 511 receives image data input to the method selection unit 51. The image data received in step S1 has been processed by the gamma correction unit 21 and temporarily stored in the HDD 3. The document type determination unit 511 then acquires the OCR setting information. The OCR setting information is set by the user when the scanner 1 reads a document.

Subsequently, the document type determination unit 511 determines the document type of the document read by the scanner 1 based on the acquired OCR setting information. The document type determination unit 511 then transmits the image data and the document type determination result to the method setting unit 512.

In the present embodiment, as illustrated in FIG. 5, when the OCR setting information indicates that OCR is to be used, the document type is determined as the "many characters or numerals" type. By contrast, when the OCR setting information indicates that OCR is not to be used, the document type is determined as the "few characters or numerals" type.

In step S2, the method setting unit 512 receives the image data and the document type determination result from the document type determination unit 511. The method setting unit 512 then determines whether the document type determination result indicates the "many characters or numerals" type. If the document type determination result indicates the "many characters or numerals" type (YES in S2), the method setting unit 512 advances the process to step S3. By contrast, when the document type determination result indicates the "few characters or numerals" type (NO in S2), the method setting unit 512 advances the process to step S4.

In step S3, the method setting unit 512 sets the top-bottom determination method to the OCR top-bottom determination method. This is because there is a high probability that the top-bottom orientation is more accurately determined by the OCR top-bottom determination method when the document type is the "many characters or numerals" type. The method setting unit 512 transmits the image data and the setting value of the top-bottom determination method to the method updating unit 513.

In step S4, the method setting unit 512 sets the top-bottom determination method to the AI top-bottom determination method. This is because there is a high probability that the top-bottom orientation is more accurately determined by the AI top-bottom determination method when the document type is the "few characters or numerals" type. Alternatively, in step S4, a non-OCR top-bottom determination method other than the AI top-bottom determination method may be set. The method setting unit 512 transmits the image data and the setting value of the top-bottom determination method to the method updating unit 513.

In step S5, the method updating unit 513 receives the image data and the setting value of the top-bottom determination method from the method setting unit 512. The method updating unit 513 presents, to the user, the setting value of the top-bottom determination method and available options of the top-bottom determination method. For example, the method updating unit 513 displays a display screen (i.e., a user interface) on which the top-bottom determination method can be selected on the control panel 1040 of the image forming apparatus 100.

In step S6, the method updating unit 513 determines whether the user has changed the top-bottom determination method. Assuming that the user changes the top-bottom determination method by performing, on the control panel 1040, an operation of selecting a top-bottom determination method different from the top-bottom determination method indicated by the current setting value. In this case, the method updating unit 513 advances the process to step S7. By contrast, when the user has not changed the top-bottom determination method, the method updating unit 513 advances the process to step S8.

In step S7, the method updating unit 513 acquires the top-bottom determination method selected by the user. The method updating unit 513 then updates the setting value of the top-bottom determination method to the setting value indicating the acquired top-bottom determination method.

In step S8, the method updating unit 513 outputs the image data and the setting value of the top-bottom determination method to the method selection unit 51. The image data and the setting value of the top-bottom determination method output from the method selection unit 51 are input to the top-bottom determination unit 52.

As described above, the image forming apparatus 100 according to the present embodiment sets a top-bottom determination method for determining the top-bottom orientation of an image based on the type of a document read by the scanner 1. For example, when a plurality of top-bottom determination methods is available, an appropriate top-bottom determination method varies depending on the type of the document. Selecting an appropriate top-bottom determination method in accordance with the type of document increases the accuracy of top-bottom determination. As a result, the image forming apparatus 100 according to the present embodiment can determine the top-bottom orientation of the document with high accuracy.

The image forming apparatus 100 according to the present embodiment determines the type of a document in accordance with the setting information indicating whether to use OCR. When the use of OCR is selected, the probability that the document is suitable for the OCR top-bottom determination method is high. When the user does not select the use of OCR, the probability that the document is suitable for the OCR top-bottom determination method is low. Accordingly, the image forming apparatus 100 according to the present embodiment can select the top-bottom determination method suitable for the type of the document.

Second Embodiment

In the first embodiment, the document type is determined based on the setting information indicating whether OCR is to be used. In the second embodiment, the document type is determined using a learned model prepared in advance by deep learning.

In the present embodiment, the document type output from the learned model may be used as the determination result of the document type. Alternatively, the document type determination using the learned model may be combined with the document type determination using the OCR setting information described in the first embodiment. For example, when the result of document type determination using the OCR setting information differs from the result of document type determination using the learned model, one of the document type determination results may be given a high priority.

In some of cases where a plurality of documents (or a document having a plurality of pages) is scanned at a time, whether to use OCR is not settable for each document. As a result, in the document type determination using the OCR setting information described in the first embodiment, the document type is not determined for each document when a plurality of documents (or a document having a plurality of pages) is scanned at a time.

By contrast, the document type determination using a DNN is advantageous in that the document type can be determined for each document when a plurality of documents (or a document having a plurality of pages) is scanned at a time. In other words, the image forming apparatus 100 according to the present embodiment can switch the top-bottom determination method appropriately for each document when a plurality of documents (or a document having a plurality of pages) is scanned at a time.

Functional Configuration

The image forming apparatus according to the second embodiment can have a functional configuration similar to that of the first embodiment illustrated in FIG. 3 except the differences described below. The document type determination unit 511 according to the present embodiment determines the document type of the image data read from the HDD 3 based on a prediction result provided by the learned model. When the image data read from the HDD 3 corresponds a plurality of documents (or a document having a plurality of pages), the document type determination unit 511 determines the document type of the image data for each document (or each page).

The learned model in the present embodiment is a machine-learned model that has learned the relationship between an image representing the content of a document and the document type of the document. In the present embodiment, the structure of the learned model is a neural network model based on deep learning. Typically, a deep neural network (DNN) is adopted in such a neural network model. In other words, the learned model is a model for determining the document type based on a feature value extracted from the image representing the content of the document. However, the learned model may be any model that determines the document type based on the image.

FIG. 8 is a diagram illustrating document type determination results according to the present embodiment. As illustrated in FIG. 8, the learned model in the present embodiment receives image data obtained by reading a document with the scanner 1 and outputs a document type determination result representing "text document," "business form," "photograph," or "drawing." However, the document types to be determined are not limited thereto and can be set as desired.

In the present embodiment, each document type output by the learned model is associated, in advance, with the top-bottom determination method to be set. FIG. 9 is a diagram illustrating a table storing setting values of the top-bottom determination methods according to the present embodiment. As illustrated in FIG. 9, in the present embodiment, when the document type is "text document" or "business form," the top-bottom determination method is set to the OCR top-bottom determination method. By contrast, when the document type is "photograph" or "drawing," the top-bottom determination method is set to the AI top-bottom determination method. Alternatively, a non-OCR top-bottom determination method other than the AI top-bottom determination method may be associated with "photograph" or "drawing."

Processing Procedure

Figure 10:
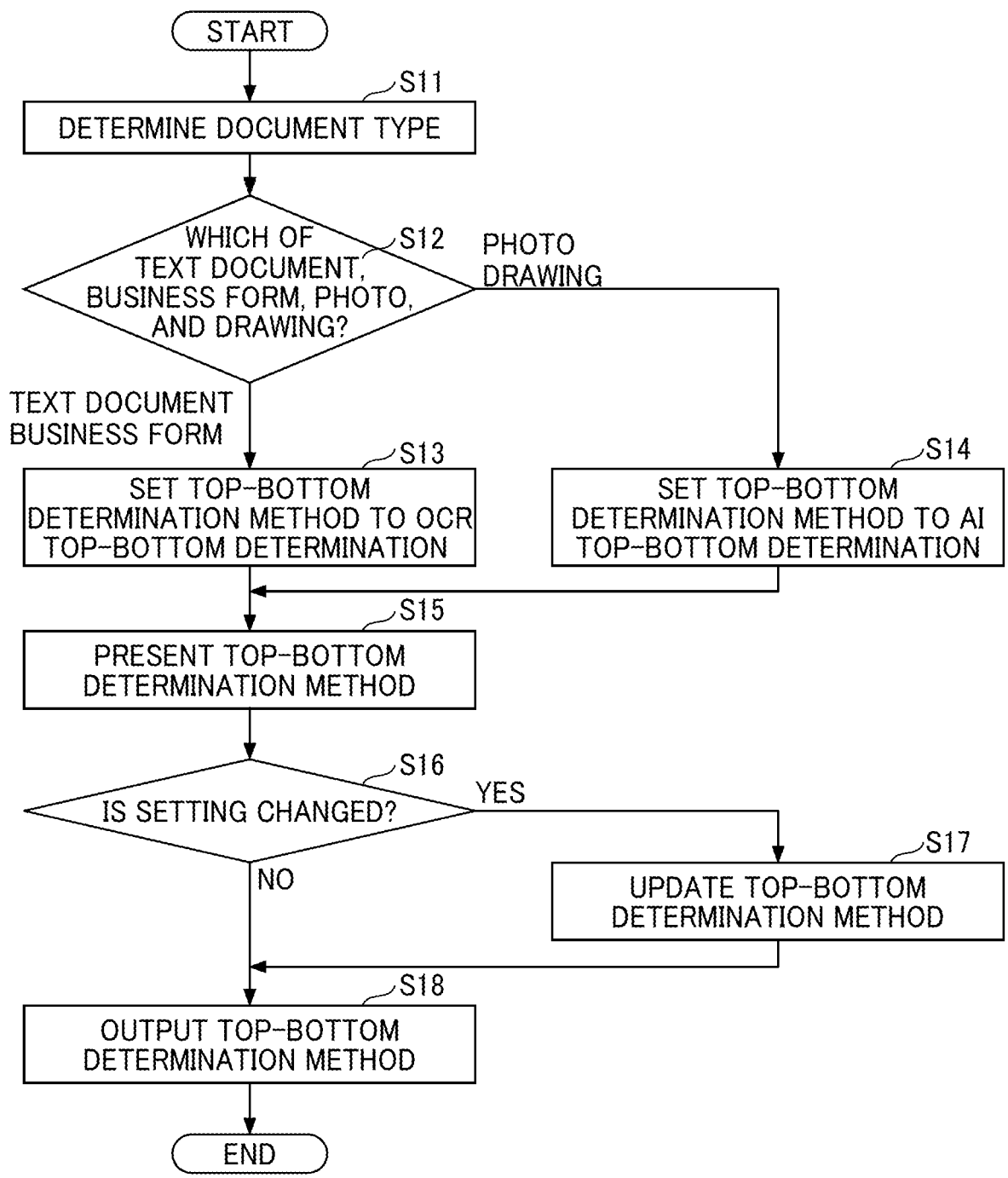
FIG. 10 is a flowchart of a method selection process according to the second embodiment of the present disclosure.

A description is given below of a method selection process performed by the method selection unit 51 according to the present embodiment with reference to FIG. 10. FIG. 10 is a flowchart of the method selection process according to the present embodiment.

In step S11, the document type determination unit 511 receives image data input to the method selection unit 51. The document type determination unit 511 acquires a learned model. In the present embodiment, as illustrated in FIG. 8, the learned model determines the document type as one of "text document," "business form," "photograph," and "drawing."

Subsequently, the document type determination unit 511 inputs the image data to the acquired learned model to determine the document type of the document read by the scanner 1. The document type determination unit 511 may perform pre-processing such as reducing or enlarging before inputting the image data to the learned model. The document type determination unit 511 transmits the image data and the document type determination result to the method setting unit 512.

In step S12, the method setting unit 512 receives the image data and the document type determination result from the document type determination unit 511. The method setting unit 512 then determines which document type the document type determination result indicates.

When the document type determination result indicates "text document" or "business form," the method setting unit 512 advances the process to step S13. By contrast, when the document type determination result indicates "photograph" or "drawing," the method setting unit 512 advances the process to step S14.

In step S13, the method setting unit 512 sets the top-bottom determination method to the OCR top-bottom determination method. This is because when the document type is "text document" or "business form," the document has many characters, and there is a high probability that the top-bottom orientation can be more accurately determined by the OCR top-bottom determination method. The method setting unit 512 transmits the image data and the setting value of the top-bottom determination method to the method updating unit 513.

In step S14, the method setting unit 512 sets the top-bottom determination method to the AI top-bottom determination method. This is because when the document type is "photograph" or "drawing," the document has few characters, and there is a high probability that the top-bottom orientation can be more accurately determined by the AI top-bottom determination method. Alternatively, in step S14, a non-OCR top-bottom determination method other than the AI top-bottom determination method may be set. The method setting unit 512 transmits the image data and the setting value of the top-bottom determination method to the method updating unit 513.

The process from step S15 to step S18 is similar to the process from step S5 to step S8 in the first embodiment.

As described above, the image forming apparatus 100 according to the present embodiment inputs, to a learned model, the image data obtained by reading a document with the scanner 1, to determine the type of the document. Since the use of machine learning enables more detailed classification of document types, the top-bottom determination method can be appropriately set according to the document type. Further, when a plurality of documents (or a document having a plurality of pages) is scanned at a time, the type of the document can be determined for each page. Accordingly, even for a mixture of documents suitable for different top-bottom determination methods, a suitable top-bottom determination method can be set for each document. As a result, the image forming apparatus 100 according to the present embodiment can determine the top-bottom orientation of the document with high accuracy.

Further, the image forming apparatus 100 in any one of the above-described embodiments is one example of an image processing apparatus capable of determining the top-bottom orientation of a scanned image. In another example, the image processing apparatus may be implemented by a computer that is provided separately from the scanner 1 and the plotter 4 and has the functions of the image processor 2, the image-file-format converter 5, and the HDD 3. In another example, the image processing apparatus may be implemented by a scanner apparatus having the functions of the image processor 2, the image-file-format converter 5, the HDD 3, and the scanner 1.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the above-described embodiments may be implemented by one or more pieces of processing circuitry. The "processing circuit or circuitry" in the present disclosure includes a programmed processor to execute each function by software, such as a processor implemented by an electronic circuit; and devices, such as an application specific integrated circuit (ASIC), a digital signal processor (DSP), a field programmable gate array (FPGA), conventional circuit modules and/or combinations thereof which are configured or programmed to perform the disclosed functionality.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus comprising circuitry configured to:
    determine a type of a document read by a scanner based on a number of characters or numerals contained in the document;
    select a top-bottom determination method from a plurality of top-bottom determination methods based on the type of the document; and
    determine a top-bottom orientation of a target image by the selected top-bottom determination method, the target image being obtained by reading the document with the scanner.

2. The image processing apparatus according to claim 1, wherein the circuitry is configured to determine the type of the document based on setting information indicating whether to perform character recognition on the target image.

3. The image processing apparatus according to claim 1, wherein the circuitry is configured to determine the type of the document based on a feature value of the target image.

4. The image processing apparatus according to claim 3, wherein the circuitry is configured to input the target image to a learned model so as to determine the type of the document, the learned model having learned a relationship between an image representing a content of a document and a type of the document.

5. The image processing apparatus according to claim 4, wherein the document read by the scanner includes a plurality of documents, and the circuitry is configured to determine the type of the document for each of the plurality of documents.

6. The image processing apparatus according to claim 1, wherein the circuitry is further configured to:
present, to a user, the top-bottom determination method set based on the type of the document; and
update the top-bottom determination method in accordance with an operation input by the user.

7. The image processing apparatus according claim 1, further comprising the scanner to read the document to obtain the target image.

8. The image processing apparatus according to claim 1, wherein the selecting of the top-bottom determination method comprises:
selecting an optical character recognition (OCR) top-down determination method when the type of the document is determined to be a text document; and
selecting an artificial intelligence (AI) top-down determination method when the type of the document is determined to be a photograph.

9. An image processing method comprising:
determining a type of a document read by a scanner based on a number of characters or numerals contained in the document;
selecting a top-bottom determination method from a plurality of top-bottom determination methods based on the type of the document; and
determining a top-bottom orientation of a target image by the selected top-bottom determination method, the target image being obtained by reading the document with the scanner.

10. A non-transitory recording medium storing a plurality of program codes which, when executed by one or more processors, causes the one or more processors to perform a method, the method comprising:
determining a type of a document read by a scanner based on a number of characters or numerals contained in the document;
selecting a top-bottom determination method from a plurality of top-bottom determination methods based on the type of the document; and
determining a top-bottom orientation of a target image by the selected top-bottom determination method, the target image being obtained by reading the document with the scanner.

* * * * *